US009553907B2

(12) United States Patent
Frydman et al.

(10) Patent No.: US 9,553,907 B2
(45) Date of Patent: Jan. 24, 2017

(54) METHODS CIRCUITS DEVICES SYSTEMS AND ASSOCIATED COMPUTER EXECUTABLE CODE FOR CONVEYING INFORMATION BETWEEN NETWORK ELEMENTS OVER AN OPEN DATAFLOW

(71) Applicant: SAGUNA NETWORKS LTD., Yokneam Illit (IL)

(72) Inventors: Daniel Nathan Frydman, Haifa (IL); Lior Fite, Zurit (IL)

(73) Assignee: SAGUNA NETWORKS LTD., Yokneam Illit (IL)

(*) Notice: Subject to any disclaimer, the term of this patent is extended or adjusted under 35 U.S.C. 154(b) by 0 days.

(21) Appl. No.: 14/168,862

(22) Filed: Jan. 30, 2014

(65) Prior Publication Data

US 2014/0189145 A1 Jul. 3, 2014

Related U.S. Application Data

(63) Continuation-in-part of application No. 13/736,098, filed on Jan. 8, 2013, now Pat. No. 8,804,725, which is a continuation of application No. 12/561,324, filed on Sep. 17, 2009, now Pat. No. 8,369,328.

(60) Provisional application No. 61/758,375, filed on Jan. 30, 2013, provisional application No. 61/225,269, filed on Jul. 14, 2009.

(51) Int. Cl.
*H04L 29/06* (2006.01)

(52) U.S. Cl.
CPC ............ *H04L 65/60* (2013.01); *H04L 69/22* (2013.01); *H04L 69/161* (2013.01)

(58) Field of Classification Search
None
See application file for complete search history.

(56) References Cited

U.S. PATENT DOCUMENTS

| | | | |
|---|---|---|---|
| 2004/0052259 A1* | 3/2004 | Garcia | H04L 12/2602 370/392 |
| 2004/0059797 A1* | 3/2004 | Velan et al. | 709/219 |
| 2005/0053068 A1* | 3/2005 | Toth et al. | 370/390 |
| 2006/0098645 A1* | 5/2006 | Walkin | 370/389 |
| 2008/0205400 A1* | 8/2008 | Ramalho | 370/392 |
| 2008/0267185 A1* | 10/2008 | Biskner | 370/392 |
| 2009/0144818 A1* | 6/2009 | Kumar et al. | 726/13 |
| 2011/0185073 A1* | 7/2011 | Jagadeeswaran et al. | 709/228 |
| 2013/0163470 A1* | 6/2013 | Chidambaram et al. | 370/255 |
| 2014/0064058 A1* | 3/2014 | Agrawal | H04W 28/12 370/221 |
| 2014/0177634 A1* | 6/2014 | Jiang et al. | 370/392 |

(Continued)

Primary Examiner — Duc Duong
(74) Attorney, Agent, or Firm — Vladimir Sherman; Professional Patent Solutions (57) ABSTRACT

Disclosed are methods, circuits, devices, systems and associated computer executable code for providing information exchange between two or more network elements of a communication network over an existing or open dataflow. According to embodiments, there may be provided two or more network elements adapted to perform deep packet inspection of an existing packet and to modify one or more fields of the packet header to include information to be conveyed to another network element further along the packet flow path. According to some embodiments, one or more of the network elements may reside within a tunneled area of the communication network.

18 Claims, 5 Drawing Sheets

(56) References Cited

U.S. PATENT DOCUMENTS

2014/0330982 A1\* 11/2014 Jalan ................... H04L 63/0892
  709/229
2015/0244781 A1\* 8/2015 Agarwal ................. H04L 69/16
  709/203

\* cited by examiner

METHODS CIRCUITS DEVICES SYSTEMS AND ASSOCIATED COMPUTER EXECUTABLE CODE FOR CONVEYING INFORMATION BETWEEN NETWORK ELEMENTS OVER AN OPEN DATAFLOW

CROSS REFERENCE

The present application claims the priority of U.S. Provisional Patent Application No. 61/758,375, filed Jan. 30, 2013, and U.S. Utility patent application Ser. No. 13/736,098, filed Jan. 8, 2013 with a priority date of Jul. 14, 2009. The disclosures of both applications, from which priority is claimed, are hereby incorporated herein by reference in their entirety.

FIELD OF THE INVENTION

Some embodiments relate generally to the field of data communication. More specifically, some embodiments relate to conveying information between two or more network elements over an open dataflow, such as a TCP/IP or UDP stream, passing through the two or more network elements.

BACKGROUND

Remote on-demand access to computer and communication network resources, including Internet access, is widespread. With the Internet becoming increasingly popular and almost ubiquitous, more and more network users are able to connect to an ever-growing body of content stored on an ever-growing number of remote servers using almost any electronic device with an internet connection. Users are able to connect to the Internet from home computers, laptops, tablets, smart phones, e-book readers, and any other mobile Internet device. When connected to the internet, users often download or stream significant amounts of data from various data sources, such as websites, media servers and Application Servers hosted on servers connected to the Internet or on Content Delivery Networks (CDN's).

Data servers, Media Servers and Application Engines connected to a data network, such as the Internet, at one or more network nodes, are typically identifiable and addressable using an Internet Protocol (e.g. IP v4 and v6) address. Websites and other data sources connected to the Internet, however, are typically associated with a server name or domain name. The Domain Name System (DNS) is a hierarchical distributed naming system for computers, services, or any resource connected to the Internet or a private network. It associates various information with domain names assigned to each of the participating entities. A Domain Name Service resolves queries for these names into IP addresses for the purpose of locating computer services and devices either on a local network or worldwide on the Internet. By providing a worldwide, distributed keyword-based redirection service, the Domain Name System is an essential component of the functionality of the Internet.

An often-used analogy to explain the Domain Name System is that it serves as the phone book for the Internet by translating human-friendly computer hostnames into IP addresses. For example, the domain name www.example.com translates to the addresses 192.0.43.10 (IPv4) and 2620:0:2d0:200::10 (IPv6). Unlike a phone book, DNS can be quickly updated and these updates are distributed, allowing a service's location on the network to change without affecting the end users, who continue to use the same hostname. Users take advantage of this when they recite meaningful Uniform Resource Locators (URLs) and e-mail addresses without having to know how the computer actually locates the services.

The Domain Name System distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism has made the DNS distributed and fault tolerant and has helped avoid the need for a single central register to be continually consulted and updated. Additionally, the responsibility for maintaining and updating the master record for the domains is spread among many domain name registrars, who compete for the end-user's, domain-owner's, business. Domains can be moved from registrar to registrar at any time. The Domain Name System also specifies the technical functionality of this database service. It defines the DNS protocol, a detailed specification of the data structures and communication exchanges used in DNS, as part of the Internet Protocol Suite.

The Internet maintains two principal namespaces, the domain name hierarchy and the Internet Protocol (IP) address spaces. The Domain Name System maintains the domain name hierarchy and provides translation services between it and the address spaces. Internet name servers and a communication protocol implement the Domain Name System. A DNS name server is a server that stores the DNS records for a domain name, such as address (A) records, name server (NS) records, and mail exchanger (MX) records (see also list of DNS record types); a DNS name server responds with answers to queries against its database.

The growing demand for packet data (e.g. TCP/IP) services over mobile networks, including: (1) mixed and rich content websites, and (2) video and audio content streaming, has fostered enormous bandwidth and data traffic requirements for mobile communication/access networks. A single webpage may include URL's to multiple content sources, static and dynamic, and the loading of a single webpage may typically require between 15 and 20 DNS transactions with a remote DNS server. During peak network traffic hours, these requests may take between 3 and 4 seconds, thereby leading to a long delay in start of service and consequentially, to customer frustration.

Additionally, in 2009 the volume of data traffic over mobile network exceeded that of voice traffic, mobile data has more or less tripled each year in volume thus taking over more and more of the mobile traffic in volume. On the profitability side, mobile data opens new revenue possibilities to the MNOs. A major obstacle standing before the MNOs, however, is their inability to connect to the content, thus suffering from the Over-The-Top (OTT) syndrome. In addition, many of the applications generate data that imposes inflexible requirements on the way traffic should be served over the network. In order to enable adequate user experience, the data must be supplied to the UE according to strict bit-rate requirements. Any deviations from these requirements automatically lead to lousy experiences and eventually, to the abandonment of the service by consumers.

An additional important factor is the protocol used to pass data over the network—TCP. Wireless networks are characterized by high losses due to radio propagation impairments, high delays, and limited bandwidth. Small scale degradations over the air interface, such as fast fading, induce fluctuations and losses over the air interface are mistakenly taken as congestion over the fixed networks by TCP. Although radio link control mechanisms typically use retransmissions to achieve error free communications over the air interface, these radio retransmissions cause delays that are large compared to TCP timescales, resulting in degradation of end-to-end throughput through the network. A major issue is that TCP misinterprets errors over wireless links as congestions and reacts by retransmitting TCP segments and by reducing the congestion window and thus the overall application throughput. The main factors driving the TCP performance are the TCP roundtrip delay and Packet loss. Reducing the RTT and packet loss can dramatically improve the TCP behavior and thus the way data is passing over the network.

Irrespective of the cause of packet delay between an application running on a wireless communication device and a content source, there is a need in the field of mobile wireless device communication to accelerate communication session setup and content access between applications running on mobile network client devices and content sources accessible through the mobile network.

In many cases, TCP flows are passed between 2 termination points through different network elements which pass the TCP flows transparently. In many cases it is desirable to enable these elements to add or extract information into/from the existing open TCP flows for the use of other elements on the route of these TCP flows without the need to terminate the existing TCP flows and establish new ones. In many cases the TCP flows are encapsulated in a tunnel, as is the case in a mobile RAN, which makes the required solution even more complicated.

SUMMARY OF THE INVENTION

The present invention includes methods, circuits, devices, apparatuses, systems and associated computer executable code for providing data connectivity between two or more network elements of a communication network, such as: (1) a local or wide area data network, (2) a wireless/mobile data network, (2) a cellular communications network, (3) a video streaming network, and (4) any other data network type known today or to be devised in the future. According to some embodiments, information to be conveyed between the two or more network elements may be added to an existing and/or open dataflow, also referred as a data stream, passing between the two network elements. The open dataflow may or may not originate at either of the two or more network elements. The open dataflow may or may not terminate at either of the network elements. According to some embodiments, both of the network elements may be pass-through or gateway elements for the open dataflow, which dataflow may originate and/or terminate outside of the two or more network elements.

According to embodiments, the communication network may include a Network Core (NC) connected through one or more data tunnels to one or more network access segments, which segments may be comprised of: (1) a single wireless access point, base-station and/or cell site (hereinafter "Access Point" or "AP"), and/or may include (2) any combination of access points, base-stations and/or cell sites in geographic or communicational proximity with one another (hereinafter collectively "Access Points" or "AP's").

According to embodiment, the open dataflow or data stream may be a data packet flow or a data packet stream, such as a TCP/IP packet stream/flow or a UDP packet stream/flow. The terms dataflow, data stream, packet flow, packet stream, TCP/IP stream/flow, TCP flow/stream may be used herein interchangeably. The open dataflow may originate from another network element, a content source (such as a data server, media server, application server or application engine) and/or a CDN (hereinafter collectively referred to as a: "Content Source") accessible through the network. The open dataflow may terminate at another network element or at a computing or communication device (such as a computer, tablet, cellphone, smartphone, etc.) connected to an access point of the network.

A network element adding or inserting information to a dataflow may be referred to as a source element, and a network element reading and/or extracting the added information from a dataflow may be referred to as a sink element. Either a source and/or a sink element according to embodiments may reside: (1) at or near a network core, (2) at or near a network access point, or (3) within a network tunnel. Source or sink network elements residing within tunneled areas of a communication network may include communication processing circuits or logic supporting any type of network tunnel protocols, including L2TP, GTP, PPP, IuPS, IuB, etc.

According to embodiments, there may be provided systems and methods to implement a capability of inserting information into an open TCP/IP flow, for information distribution between different network elements inside of a network, without the need to terminate and re-establish the existing and/or open TCP/IP flow. According to embodiments, one or more network elements along a TCP/IP flow path, for example one or more source elements, may include a Deep Packet Inspection ("DPI") module with DPI capabilities for inspection of TCP/IP packets and for insertion of information into the packets. DPI modules on a sink network element may read and/or extract information added or inserted to a TCP/IP flow by a source network element along a path of the TCP/IP flow.

An optional mechanism for adding information to a TCP/IP packet, according to embodiments, includes the use of an available TCP/IP options fields inside the TCP/IP packet header. Information to be added to a TCP/IP packet by a source element may be inserted into any available field in the TCP/IP options portion of the TCP/IP packet's header. Along with the insertion, a rectifying modification (e.g. fixing) of fields in the various headers of the packets may be performed and then the modified packets may be forwarded towards the destination of the added information (e.g. sink element). The added information destination (e.g. sink element) may also have DPI capabilities which may be used to read or look into the packet, search for such information that exists in the TCP options fields of the packets, extract the relevant information if required, fix (e.g. revert back) any portions of the packet headers, when needed and forward the packets towards the packets' initially intended or designated destination, usually a user device.

Communication of information between two or more network elements may be unidirectional or bidirectional. Accordingly, a network element may be both a source network element, adding its information to either an upstream or downstream TCP flow, and it may concurrently be a sink network element, receiving information added by another network element to the same or another TCP flow. According to embodiments, for example when the communication network is a cellular communication network, information added to and/or extracted from an open dataflow may include information regarding a network condition along a segment of the dataflow path, wherein the network condition may include: (1) RF reception quality, (2) latency, (3) jitter, (4) network congestion, and/or (5) any other relevant network condition information. According to further embodiments, information added to and extracted from an open dataflow may include information regarding content within the dataflow (e.g. TCP or UDP stream) itself, wherein the dataflow content information may include: (1) content identifiers, (2) content categorization information, (3) content transport priority designators, (4) content consumer/user identifiers, (5) content consumer/user location, (6) content billing information, and/or (7) any other relevant content related information. The added/extracted information may be a mix of information items including information regarding the specific data-stream it has been extracted from or any other specific or general information regarding other traffic passing over the network or the network itself. For example, the information may include radio conditions for the content user or for any other network user, cell congestion of the content user of any other cell on the network, and/or location information of the content user or any one or more other users.

According to some embodiments, either the sink or source network elements may be implemented as a discrete and standalone device or as a network appliance, or either the network sink or source network elements may be code or a software module running on a network router, network switch, network gateway, etc. Aspects of the present invention may provide for the augmentation of the types of information exchanged between network elements of a communication network without the need to add additional hardware or communication bandwidth, lines or paths between the network elements.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can comprise, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Aspects of the present invention may relate to an evolving need for technology which enables efficient transmission of information over an open TCP flow between 2 or more elements, wherein at least one of them is located in a location which is internal to the TCP flow, meaning, not a TCP termination point. This solution may enable passing of information between such elements while keeping the existing TCP flows open, without the need to terminate them and re-establish them in order to add the additional information. Embodiments include both the capability to insert additional information into an open TCP flow by elements optionally placed on the path of the TCP flow, and the capability to extract this information by elements optionally placed on the path of the TCP flows with only the actual TCP termination points terminating the flow.

The present invention includes systems and methods to implement a capability of inserting information into an open TCP flow for information distribution between different elements inside a network, without the need to terminate and re-establish the TCP flow. Embodiments include DPI capabilities, enabling the inspection of each packet, and inserting changes into packets before sending them out towards the destination, without the need to terminate the TCP flow. The mechanism for carrying the information inside the TCP packets may use available TCP options fields inside the TCP packet header. The required information may be inserted into available fields in the TCP options portion of the TCP headers and, after fixing any required fields in the different headers of the packets, sending the packets out towards the respective destinations. The destination element for this information may also have DPI capabilities which will be used to look into the packet, wait for such information that exists in the TCP options fields of the packets, extract the relevant information if required, fix up any portions of the packet headers when needed and send out the packets towards the destination.

According to some embodiments, there may be provided a cellular communication network comprising at least one network segment providing data stream connectivity between a data-stream source associated with a network core and a data stream sink associated with an edge node of said network. The network may include a first network module, of a network element, communicatively coupled to the network segment at a point between the data-stream source and data-stream sink, and the first network module may be adapted to add, insert or inject into the data steam information or data intended for a second network module of another network element. The second network module may be communicatively coupled to the network segment at a point between the data-stream source and the data-stream sink. A network element adding information or data to the data-stream may be termed a source network element. A network element extracting data added information or data from data-stream may be termed a sink network element.

According to embodiment, the second network module may be adapted to communicate with the first network module by injecting information into a second data-stream. Either of the data-streams may be a TCP/IP or a UDP stream. The first network module may be adapted to append data to one or more packets of the TCP/IP or UDP stream and a second network module may be adapted to strip out the appended data from the one or more TCP/IP or UDP packets. According to embodiments, the TCP/IP or UDP streams may be encapsulated in a data tunnel of the network.

Figure 1:
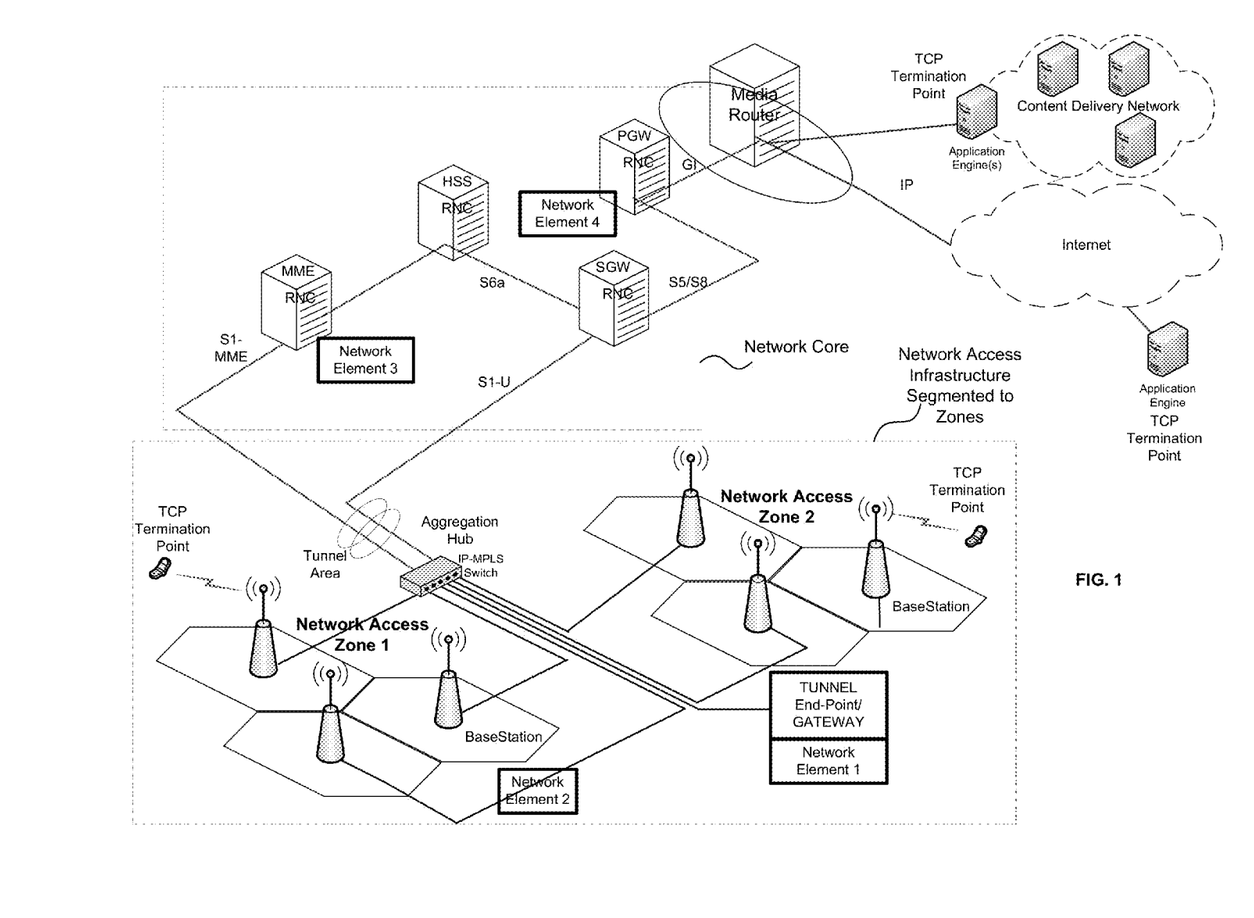
FIG. 1 is a network diagram of an exemplary data access network including and connecting to: (1) access points, (2) multiple TCP/IP terminations, and (3) source and sink network elements according to embodiments.

Turning now to FIG. 1, there is shown a network diagram of an exemplary data access network including and connected to: (1) access points, (2) multiple TCP/IP terminations, and (3) source and sink network elements according to embodiments. Dataflow, such as TCP/IP or UDP packet streams, may originate at an external source such as a server or CDN, pass through various segments and elements of the network, and terminate at a user device. Dataflow in the reverse direction is also possible. As shown in FIG. 1, various network elements may be associated with various portions of the network, such as the access points, gateways, servers, etc. These network elements, according to embodiments of the present invention, may convey information between each other by adding and later extracting information/data from an open dataflow initiated between two devices.

Figure 2:
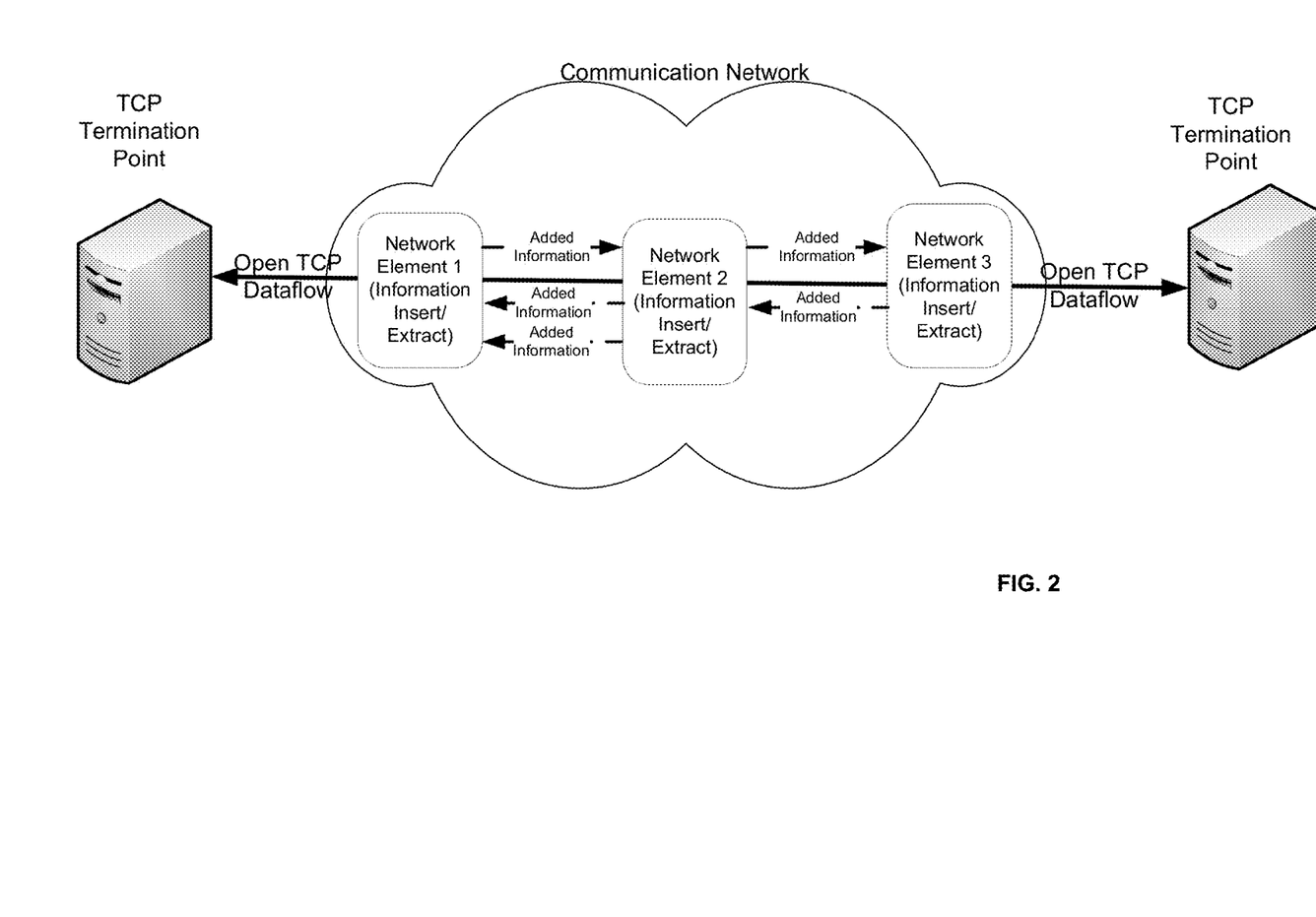
FIG. 2 is a communication diagram illustrating the positioning of two network elements, according to embodiments, between two TCP termination points, wherein the network elements insert their own information into an open TCP flow established between the two TCP termination points.

FIG. 2 illustrates the positioning of two network elements, according to embodiments, between two TCP dataflow termination points, wherein the network elements insert their own information into an open TCP flow established between the two TCP termination points. As can be seen in FIG. 2, the network (TCP insert/extract) elements are placed on the TCP flow, optionally between the termination points. These elements can be a box level solution or a pure SW solution integrated into existing equipment. Each of the network insert/extract elements may also be integrated into a TCP termination element but may also be an internal element to the TCP flow.

By example, each TCP insert/extract element may be one or a combination of the following:
 1. A source TCP termination point
 2. A TCP insert element placed in a location that is internal to the TCP flow (thus not a termination point)
 3. A TCP extract element placed in a location that is internal to the TCP flow (thus not a termination point)
 4. A destination TCP termination point The TCP insert/extract element may include any subset, or all, of the following capabilities:
 1. DPI capabilities, enabling the inspection of each TCP packet that passes through the element.
 2. The capability to insert information into the TCP options fields of the TCP packets and "fix" the packet headers as is required to preserve the legality of the packet.
 3. The capability to extract information from the TCP options and optionally to remove this information from the TCP header. It may than "fix" the packet headers as is required to preserve the legality of the packet.

Figure 3:
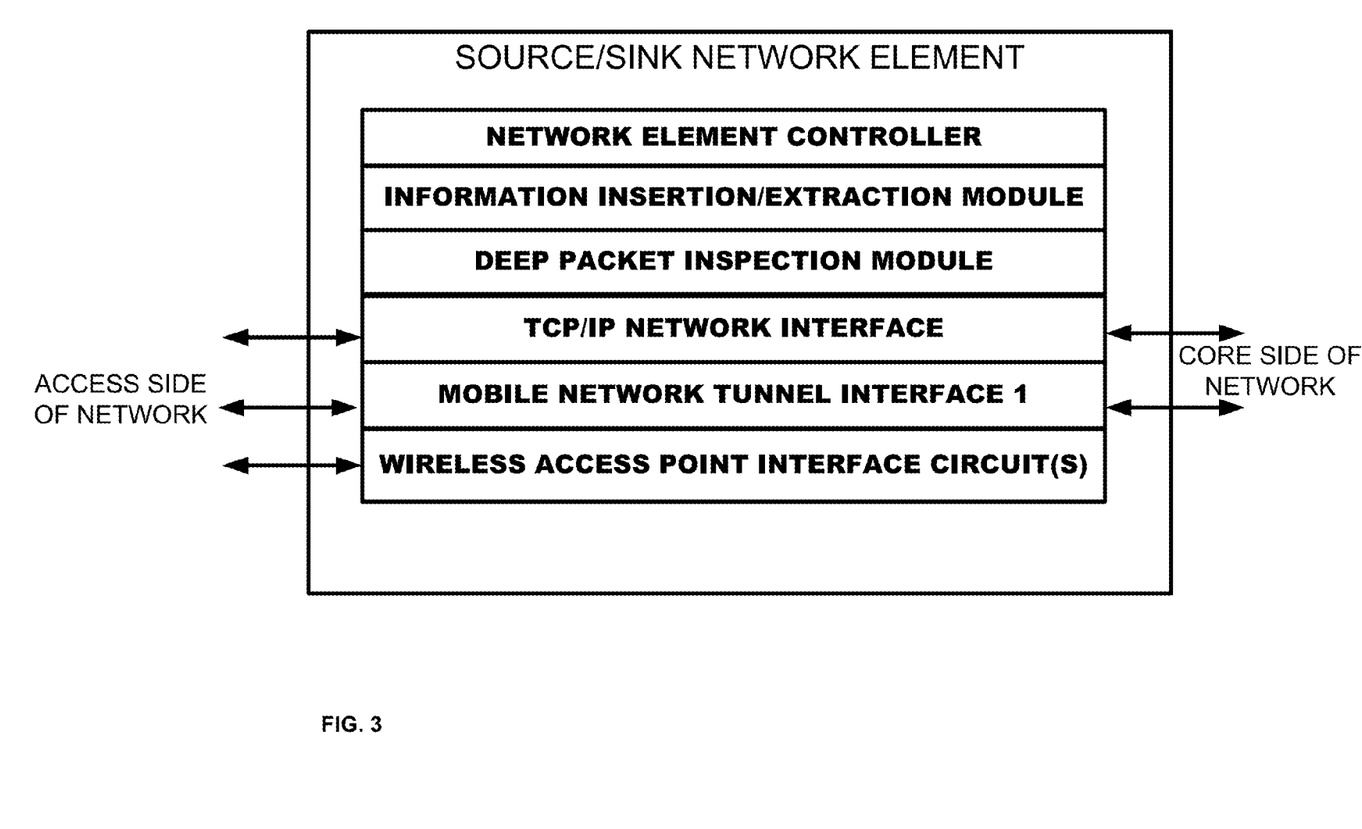
FIG. 3 is a functional block diagram of an exemplary network element, according to embodiments, including interfaces for various segments of a cellular network, a deep packet inspection module, information insertion/extraction module and a controller.
Figure 4:
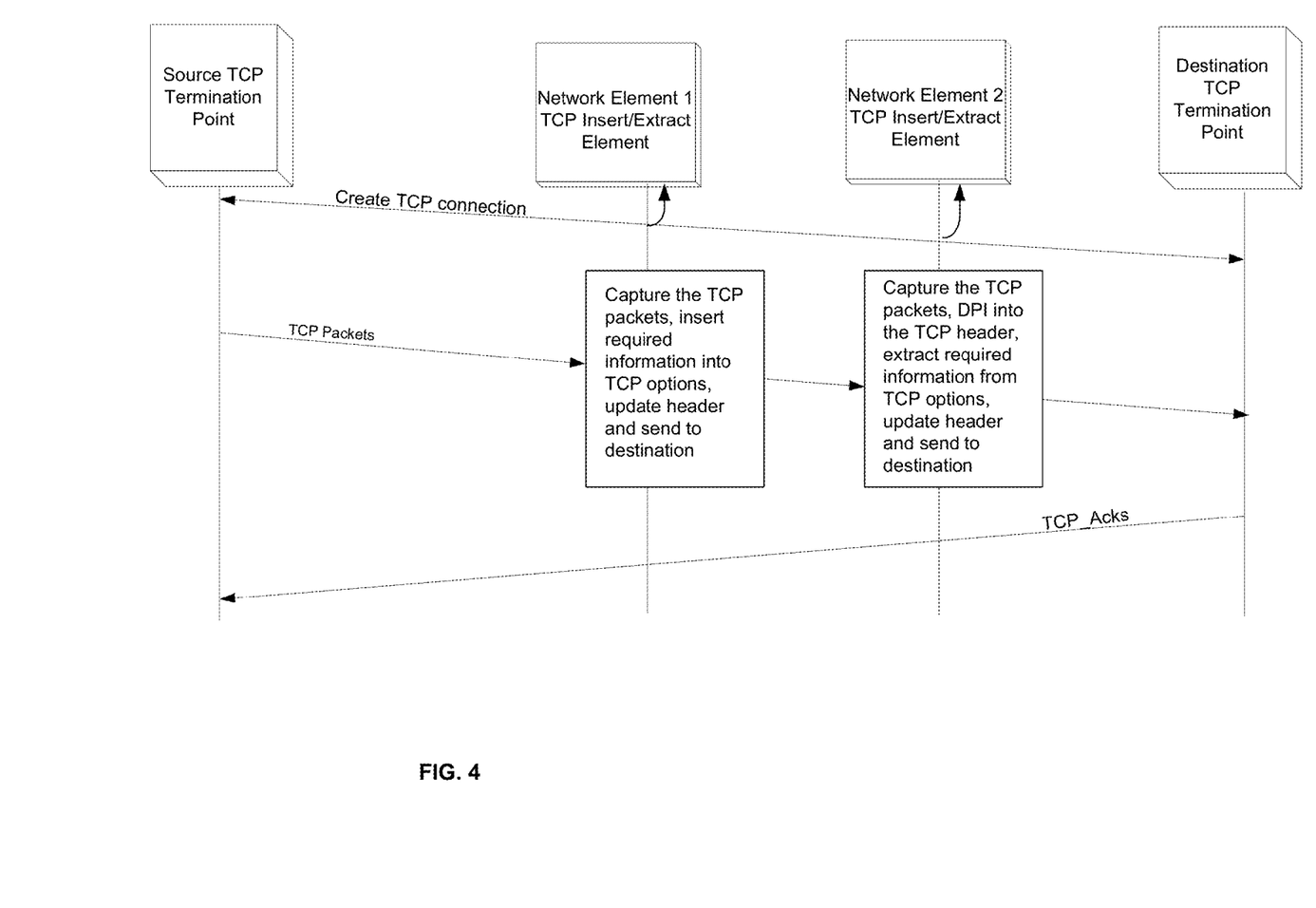
FIG. 4 is packet flow diagram according to embodiments including two network elements situated within the dataflow path between two communicating TCP termination points.
Figure 5A:
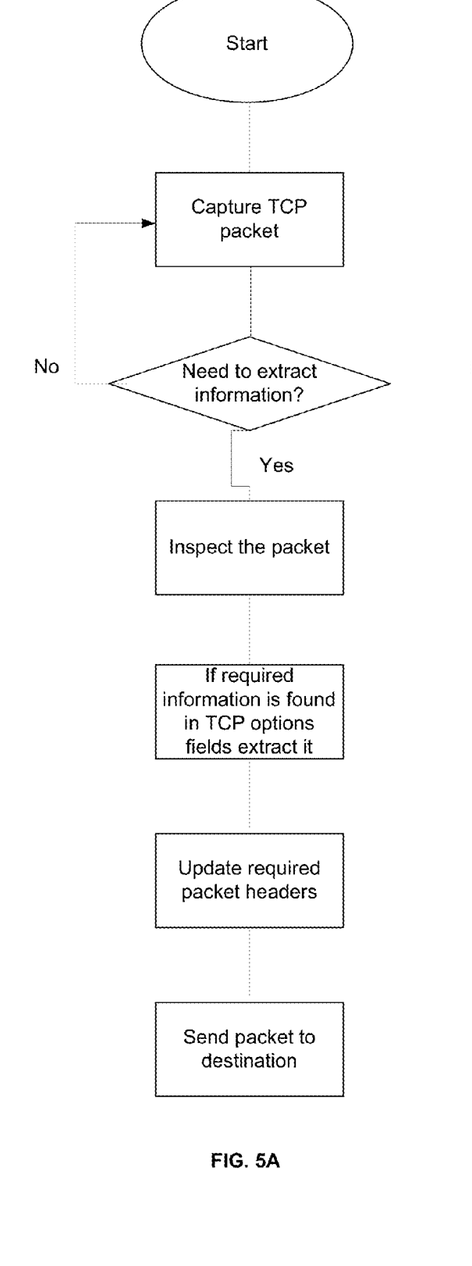
FIGS. 5A and 5B are flow charts including steps of an exemplary information extraction and an exemplary information insertion methodology, respectively, applicable to a network element according to embodiments.
Figure 5B:
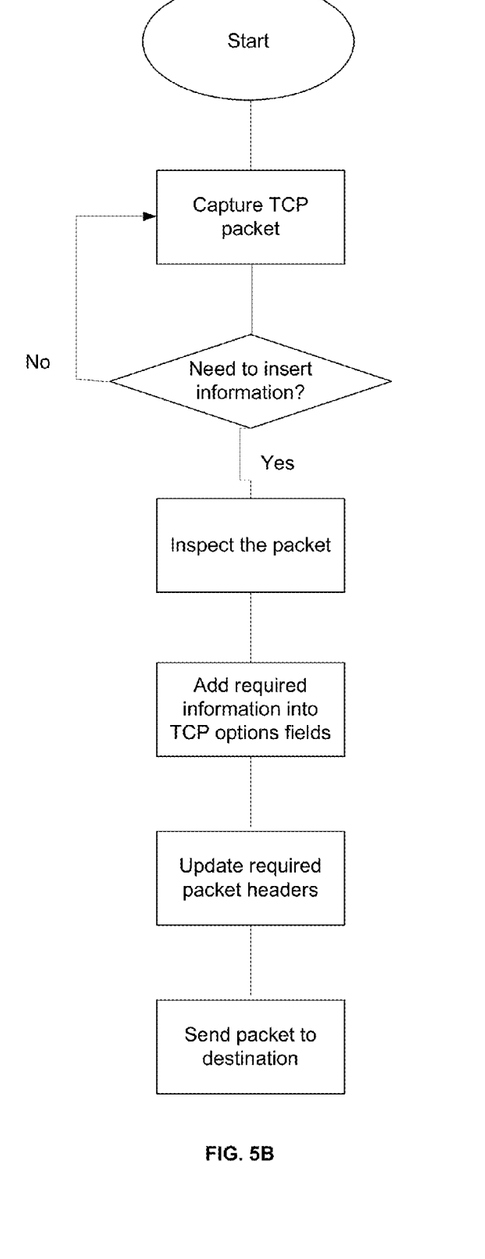

Turning now to FIG. 3, there is shown a functional block diagram of an exemplary network element, according to embodiments, including interfaces for various segments of a cellular network, a deep packet inspection module, information insertion/extraction module and a controller. Using the capabilities of the module present therein, the element that is required to insert information into the TCP flow may capture the TCP packets through the relevant interface, insert the relevant information into the determined TCP options fields, optionally update the relevant fields in the packet headers and send the packets out towards the destination through the relevant interface. An element that is required to extract information from the TCP flow may inspect each packet, using the DPI capabilities, and detect the relevant information in the TCP options fields. Upon detection of such information, it may extract this information, eliminate it from the packet and, optionally, update the relevant fields in the packet headers and send the packets out towards the destination. The insertion and extraction are illustrated in FIG. 4, which is a packet flow diagram according to embodiments including two network elements situated within the dataflow path between two communicating TCP termination points. FIGS. 5A and 5B are flow charts including the steps of exemplary information extraction and exemplary information insertion methodologies, respectively, as applicable to a network element according to embodiments.

It should be understood that according to some embodiments, each of the separate caching entities mentioned may be implemented as separate caches, while according to other embodiments two or more of the caching entities may be combined into a single cache. Likewise, each of the modules, digital logics, data sniffing/detection elements, data blocking/injecting/responding elements, interface elements, network elements and/or decision making elements may be implemented separately and/or combined into the functionality of other Mobile Network associated hardware.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A communication network comprising:
   at least one network segment providing data stream connectivity, within an encapsulated data tunnel, between a data stream source associated with a network core and a data stream sink associated with an edge node of said network;
   a first network appliance communicatively coupled to said network segment at a point between said source and said sink, said first network appliance comprising:
   (i) a first network tunnel interface comprising first tunnel interfacing circuitry adapted to capture packets of an existing data stream travelling through the data tunnel, from the data stream source to the data stream sink, and inject the captured packets back into the existing data stream after they have been modified by said first appliance, without terminating the existing data stream;
   (ii) first signal processing circuitry connected to said first tunnel interfacing circuitry and adapted to inject data into options fields of the captured packets and subsequently modify a header of the captured packets to maintain a legality of the captured packets including the injected data;
   wherein said first network appliance communicates with a second network appliance by injecting data into options fields of packets of an existing data-stream between the data stream source and the data stream sink,
   said second network appliance also being communicatively coupled to said network, at another point between said source and said sink, said second network appliance comprising:
   (i) signal analyzing circuitry coupled to said network segment and adapted to deep inspect packets of the existing data stream and identify packets including data intended for said second network appliance injected into the data stream by said first network appliance;
   (ii) a second network tunnel interface comprising second tunnel interfacing circuitry adapted to capture the identified packets of the existing data stream travelling through the data tunnel and inject the captured identified packets back into the existing data stream after they have been modified by said second appliance, without terminating the existing data stream; and
   (iii) second signal processing circuitry connected to said second tunnel interfacing circuitry and adapted to extract the injected data out of the captured identified packets.

2. The communication network according to claim 1, wherein said existing data stream is a UDP stream.

3. The communication network according to claim 1, wherein said second network appliance is adapted to communicate with said first network appliance by injecting data into options fields of packets of a second data-stream.

4. The communication network according to claim 1, wherein said existing data-stream is a TCP/IP stream.

5. The communication network according to claim 1, wherein said first network appliance is further adapted to modify headers of the packets of the existing data-stream to maintain a legality of the packets including the injected data.

6. The communication network according to claim 5, wherein said second network appliance is further adapted to modify headers of the packets after extracting the data to maintain legality of the packets after extracting the data.

7. The communication network according to claim 1, wherein the injected data relates to content within the existing data-stream.

8. The communication network according to claim 1, wherein the injected data relates to a user of the data within the data-stream.

9. The communication network according to claim 1, wherein the data tunnel is of type selected from the group consisting of: L2TP, GTP, PPP, IuPS, and IuB.

10. A communication system comprising:
    a first network appliance comprising:
    communication circuitry adapted to communicatively couple to a network segment providing data stream connectivity within an encapsulated data tunnel, at a point between a data-stream source and a data-stream sink;
    a first network tunnel interface comprising first tunnel interfacing circuitry adapted to capture packets of an existing data stream travelling through the data tunnel, from the data stream source to the data stream sink, and inject the captured packets back into the existing data stream after they have been modified by said first appliance, without terminating the existing data stream;

first signal processing circuitry connected to said first tunnel interfacing circuitry and adapted to inject data into options fields of the captured packets and subsequently modify a header of the captured packets to maintain a legality of the captured packets including the injected data;

a second network appliance comprising: communication circuitry adapted to communicatively couple to the network segment, at another point between the data-stream source and the data-stream sink;

signal analyzing circuitry coupled to said network segment and adapted to deep inspect packets, of the existing data stream, and identify packets including data intended for said second network appliance injected into the data stream by said first network appliance;

a second network tunnel interface comprising second tunnel interfacing circuitry adapted to capture the identified packets of the existing data stream travelling through the data tunnel and inject the captured identified packets back into the existing data stream after they have been modified by said second appliance, without terminating the data stream; and second signal processing circuitry connected to said second tunnel interfacing circuitry and adapted to extract the injected data out of the captured identified packets.

11. The system according to claim 10, wherein the existing data stream is a UDP stream.

12. The system according to claim 10, wherein said second network appliance is adapted to communicate with said first network appliance by injecting data into options fields of packets of a second data-stream.

13. The system according to claim 10, wherein the existing data-stream is a TCP/IP stream.

14. The system according to claim 12, wherein said second network appliance is further adapted to modify headers of the packets of the second data stream to maintain a legality of the packets including the injected data.

15. The system according to claim 10, wherein said second network appliance is further adapted to modify headers of the packets after extracting the data to maintain legality of the packets after extracting the data.

16. The system according to claim 10, wherein the injected data relates to content within the existing data-stream.

17. The system according to claim 10, wherein the data tunnel is of a type selected from the group consisting of: L2TP, GTP, PPP, IuPS, and IuB.

18. A communication network comprising:

at least one network segment providing data stream connectivity, within an encapsulated data tunnel, between a data stream source associated with a network core and a data stream sink associated with an edge node of said network;

a first network appliance communicatively coupled to said network segment at a point between said source and said sink, said first network appliance comprising:
  (i) a first network tunnel interface comprising first tunnel interfacing circuitry adapted to capture packets of an existing data stream travelling through the data tunnel, from the data stream source to the data stream sink, and inject the captured packets back into the existing data stream after they have been modified by said first appliance, without terminating the existing data stream;
  (ii) first signal processing circuitry connected to said first tunnel interfacing circuitry and adapted to inject data into options fields of the captured packets and subsequently modify a header of the captured packets to maintain a legality of the captured packets including the injected data;

wherein said first network appliance communicates with a second network appliance by appending data to packets of the existing data-stream, said second network appliance also being communicatively coupled to said network, at another point between said source and said sink, said second network appliance comprising:
  (i) signal analyzing circuitry coupled to said network segment and adapted to deep inspect packets, of the existing data stream, and identify packets including data intended for said second network appliance;
  (ii) a second network tunnel interface comprising second tunnel interfacing circuitry adapted to capture the identified packets of the existing data stream travelling through the data tunnel and inject the captured identified packets back into the existing data stream after they have been modified by said second appliance, without terminating the existing data stream; and
  (iii) second signal processing circuitry connected to said second tunnel interfacing circuitry and adapted to extract the appended data out of the captured identified packets.

* * * * *